US012647799B2

(12) United States Patent
Omiya et al.

(10) Patent No.: US 12,647,799 B2
(45) Date of Patent: Jun. 2, 2026

(54) WIRELESS COMMUNICATION SYSTEM, WIRELESS COMMUNICATION METHOD, AND BASE STATION DEVICE

(71) Applicant: NTT, Inc., Tokyo (JP)

(72) Inventors: Riku Omiya, Musashino (JP); Ryotaro Taniguchi, Musashino (JP); Tomoaki Ogawa, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 318 days.

(21) Appl. No.: 18/683,514

(22) PCT Filed: Aug. 18, 2021

(86) PCT No.: PCT/JP2021/030238
§ 371 (c)(1),
(2) Date: Feb. 14, 2024

(87) PCT Pub. No.: WO2023/021624
PCT Pub. Date: Feb. 23, 2023

(65) Prior Publication Data
US 2024/0357374 A1      Oct. 24, 2024

(51) Int. Cl.
H04W 16/26          (2009.01)
H04W 84/18          (2009.01)
(52) U.S. Cl.
CPC ............ H04W 16/26 (2013.01); H04W 84/18 (2013.01)
(58) Field of Classification Search
CPC .. H04B 7/0626; H04B 7/0417; H04B 7/0632; H04B 7/2606; H04W 72/23; H04W 92/10; H04W 16/26; H04W 84/18
See application file for complete search history.

(56) References Cited

U.S. PATENT DOCUMENTS

| 2020/0068632 A1* | 2/2020 | Kato | ...................... H04W 40/30 |
| 2022/0094417 A1* | 3/2022 | Ashari | ................... H04B 7/086 |

(Continued)

FOREIGN PATENT DOCUMENTS

| CN | 102547594 B * | 6/2015 | |
| CN | 105491637 B * | 8/2018 | ............ H04W 40/22 |

(Continued)

OTHER PUBLICATIONS

Nihar Jindal, "MIMO Broadcast Channels With Finite-Rate Feedback", IEEE Transactions on Information Theory, vol. 52, No. 11, Nov. 2006, pp. 5045-5060.

(Continued)

*Primary Examiner* — Dung Hong
(74) *Attorney, Agent, or Firm* — XSENSUS LLP

(57)          ABSTRACT
In a wireless communication system, a base station device communicates with a terminal device via any relay device (reconfigurable intelligent surface). The base station device stores a CSI when passing through the relay device in association with the object arrangement information. When the current object arrangement information is similar to the stored past object arrangement information, the base station device determines a relay device to be used at the present time on the basis of each CSI stored in association with the past object arrangement information. According to this, it is possible to reduce overhead for acquiring the CSI, and simultaneously execute the use determination of the plurality of reconfigurable intelligent surfaces, by re-using the CSI.

8 Claims, 7 Drawing Sheets

(56)     References Cited

U.S. PATENT DOCUMENTS

| | | | | |
|---|---|---|---|---|
| 2022/0407222 A1* | 12/2022 | Zhu | ..................... | H04B 7/0617 |
| 2023/0032511 A1* | 2/2023 | Horn | ...................... | H04W 8/02 |
| 2023/0258759 A1* | 8/2023 | Wang | ................ | H04B 7/04026 |
| | | | | 455/456.1 |
| 2023/0327714 A1* | 10/2023 | Baligh | .................. | H04B 7/088 |
| | | | | 375/262 |
| 2023/0337269 A1* | 10/2023 | Rao | ................... | H04B 7/06952 |
| 2024/0072849 A1* | 2/2024 | Haija | .................. | H04B 7/0695 |

FOREIGN PATENT DOCUMENTS

| | | | | | |
|---|---|---|---|---|---|
| CN | 106656326 B | * | 3/2019 | ............ | H04W 40/22 |
| WO | WO-2022195888 A1 | * | 9/2022 | ............. | H04B 7/145 |

OTHER PUBLICATIONS

Qingqing Wu et al., "Intelligent Reflecting Surface Enhanced Wireless Network via Joint Active and Passive Beamforming", IEEE Transactions on Wireless Communications, vol. 18, No. 11, Nov. 2019, pp. 5394-5409.

* cited by examiner

REGION INFORMATION

| BLOCK No. | CENTER X COORDINATE | CENTER Y COORDINATE |
|-----------|---------------------|---------------------|
| 1         | 10                  | 10                  |
| 2         | 10                  | 10. 5               |
| ...       |                     |                     |

WIRELESS COMMUNICATION SYSTEM, WIRELESS COMMUNICATION METHOD, AND BASE STATION DEVICE

CROSS-REFERENCE TO RELATED APPLICATION

The present application is based on PCT filing PCT/JP2021/030238, filed Aug. 18, 2021, the entire contents of which is incorporated herein by reference.

TECHNICAL FIELD

The present disclosure relates to a wireless communication system, a wireless communication method, and a base station device, and more particularly, to a wireless communication system, a wireless communication method and a base station device using a Reconfigurable Intelligent Surface (RIS).

BACKGROUND ART

A reconfigurable intelligent surface used for wireless communication is known. The reconfigurable intelligent surface is made up of a large number of reflection elements and reflects an incident radio wave. Reflection characteristics such as a reflection direction of the reconfigurable intelligent surface can be dynamically controlled. By utilizing such a reconfigurable intelligent surface, a propagation path bypassing an obstacle can be formed, or a plurality of propagation paths can be formed for a single terminal device. Accordingly, it is possible to improve communication performance such as communication quality and spatial multiplexing.

In order to perform communication using the reconfigurable intelligent surface, the base station device needs to acquire channel state information (CSI) indicating a state of a channel passing through the reconfigurable intelligent surface, and to determine use of the reconfigurable intelligent surface.

NPL 1 discloses that an access point sends a training signal to a terminal device and estimates channel state information from a response (CSI feedback) thereof. NPL 2 discloses estimation of channel state information via the RIS using the CSI feedback.

CITATION LIST

Non Patent Literature

[NPL 1] N Jindal, "MIMO Broadcast Channels With Finite-Rate Feedback," in IEEE Transactions on Information Theory, vol. 52, No. 11, pp. 5045-5060 November 2006, doi: 10.1109/TIT. 2006.883550.
[NPL 2] Q. Wu, and R. Zhang, "Intelligent reflecting surface enhanced wireless network via joint active and passive beamforming," IEEE transaction on radio communications, vol. 18, no. 11, November 2019.

SUMMARY OF INVENTION

Technical Problem

However, it takes a certain time (overhead) to acquire channel state information (CSI). In addition, since the acquisition of CSI needs to be performed sequentially for each of the plurality of reconfigurable intelligent surfaces, the overhead increases as the number of channels passing through the reconfigurable intelligent surface increases. If the overhead increases, there is a problem of a delay in the use determination of the reconfigurable intelligent surface.

The present disclosure has been made to solve the problems described above, and an object thereof is to provide a wireless communication system, a wireless communication method, and a base station device that are capable of reducing an overhead for acquiring CSI and simultaneously performing use determination of a plurality of reconfigurable intelligent surfaces.

Solution to Problem

A first aspect of the present invention relates to a wireless communication system.

The wireless communication system includes a base station device, a terminal device, and at least a first relay device and a second relay device.

The first relay device and the second relay device each have a reconfigurable intelligent surface that reflects a radio wave.

The wireless communication system is able to use a first channel through which the base station device communicates the terminal device via the reconfigurable intelligent surface of the first relay device, and a second channel through which the base station device communicates with the terminal device via the reconfigurable intelligent surface of the second relay device.

The base station device includes a sensor unit, a radio unit, an information storage unit, a similarity determination unit, and a relay device determination unit.

The sensor unit acquires object position information including positions of an obstacle and the terminal device.

The radio unit acquires first channel state information of the first channel and second channel state information of the second channel.

The information storage unit stores past object position information acquired by the sensor unit, and the first channel state information and the second channel state information acquired by the radio unit with respect to the past object position information in association with each other.

The similarity determination unit determines whether the current object position information acquired by the sensor unit is similar to the past object position information stored in the information storage unit.

The relay device determination unit determines a relay device to be used at a present time, among the first relay device and the second relay device, on the basis of the first channel state information and the second channel state information associated with the past object position information similar to the current object position information, when it is determined that the current object position information is similar to the past object position information.

A second aspect relates to a wireless communication method. The wireless communication method can use a first channel through which a base station device communicates with a terminal device via a reconfigurable intelligent surface of a first relay device and a second channel through which the base station device communicates with the terminal device via a reconfigurable intelligent surface of a second relay device. The wireless communication method includes an environment information acquisition step, a CSI acquisition step, an information storage step, a similarity determination step, and a relay device determination step.

The environment information acquisition step acquires object position information including positions of an obstacle and the terminal device.

The CSI acquisition step acquires first channel state information of the first channel and second channel state information of the second channel.

The information storage step stores past object position information acquired by the environment information acquisition step, and the first channel state information and the second channel state information acquired by the CSI acquisition process with respect to the past object position information in association with each other.

The similarity determination step determines whether the current object position information acquired by the environment information acquisition step is similar to the past object position information stored by the information storage step.

The relay device determination step determines a relay device to be used at a present time, among the first relay device and the second relay device, on the basis of the first channel state information and the second channel state information associated with the past object position information similar to the current object position information, when it is determined that the current object position information is similar to the past object position information.

A third aspect relates to a base station device.

The base station device can use a first channel through which the base station device communicates with a terminal device via a reconfigurable intelligent surface of a first relay device, and a second channel through which the base station device communicates with the terminal device via a reconfigurable intelligent surface of a second relay device. The base station device includes a sensor unit, a radio unit, an information storage unit, a similarity determination unit, and a relay device determination unit.

The sensor unit acquires object position information including positions of an obstacle and the terminal device.

The radio unit acquires first channel state information of the first channel and second channel state information of the second channel.

The information storage unit stores past object position information acquired by the sensor unit, and the first channel state information and the second channel state information acquired by the radio unit with respect to the past object position information in association with each other.

The similarity determination unit determines whether the current object position information acquired by the sensor unit is similar to the past object position information stored in the information storage unit.

The relay device determination unit determines a relay device to be used at a present time, among the first relay device and the second relay device, on the basis of the first channel state information and the second channel state information associated with the past object position information similar to the current object position information, when it is determined that the current object position information is similar to the past object position information.

Advantageous Effects of Invention

According to the present disclosure, a base station device can determine a relay device which is used at the present time, by reusing channel state information (CSI) stored in the past, when a current environment is similar to a past environment. Therefore, according to the present disclosure, it is possible to reduce overhead for acquiring CSI, and to simultaneously perform use determination of a plurality of reconfigurable intelligent surfaces.

BRIEF DESCRIPTION OF DRAWINGS

FIG. 4 is a table showing region information stored in an information storage unit according to the embodiment of the present invention.

DESCRIPTION OF EMBODIMENTS

Figure 1:
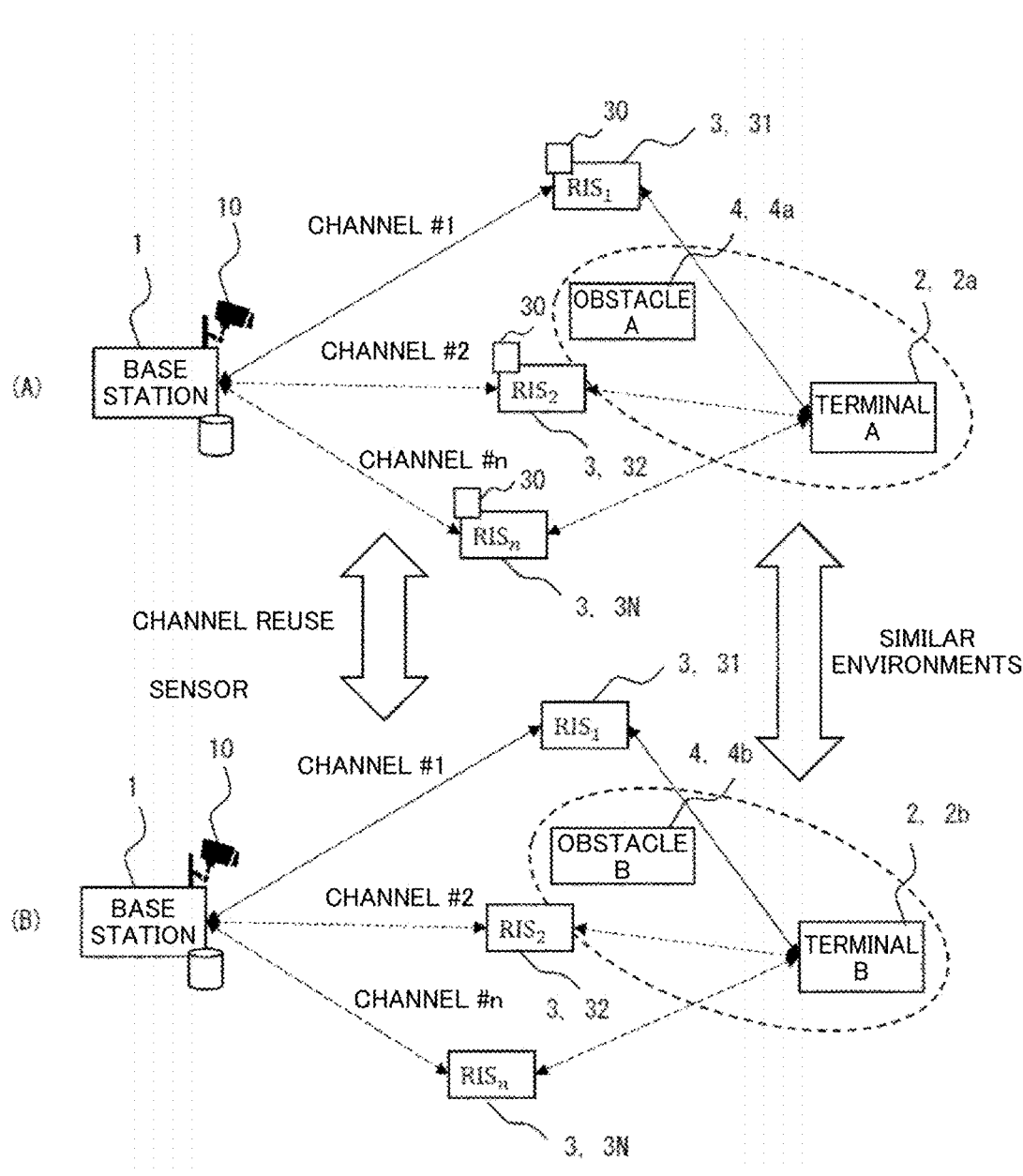
FIG. 1 is a conceptual diagram for explaining an outline of a wireless communication system according to an embodiment of the present invention.

Hereinafter, embodiments of the present invention will be described in detail with reference to the drawings. Elements that are common in each drawing are denoted by the same reference numerals, and overlapping descriptions are omitted.

Embodiment (1) Wireless Communication System

FIG. 1 is a conceptual diagram for explaining an outline of a wireless communication system according to the embodiment. The wireless communication system shown in FIG. 1 includes a base station device 1, a terminal device 2, and a plurality of relay devices 3. The base station device 1 is, for example, a radio base station under the management of a communication carrier. The terminal device 2 is a user terminal such as a smartphone. When the terminal device 2 belongs to a communication area of the base station device 1, and when there is no obstacle or the like between both of them, the terminal device 2 can directly communicate with the base station device 1.

The relay device 3 includes a reconfigurable intelligent surface 30, that is, a Reconfigurable Intelligent Surface (RIS). The reconfigurable intelligent surface 30 is made up of a large number of reflection elements, and reflects an incident radio wave (radio frequency signal). The reconfigurable intelligent surface 30 of the relay device 3 is disposed to relay radio waves between the base station device 1 and the terminal device 2. Even when the terminal device 2 cannot directly communicate with the base station device 1, in some cases, the terminal device 2 may communicate with the base station device 1 via the reconfigurable intelligent surface 30 of the relay device 3.

In FIG. 1, n relay devices 3 (a first relay device 31, a second relay device 32, . . . , an n-th relay device 3n) are shown as an example. In environments (A) and (B) shown in FIG. 1, the positions of the base station device 1 and the plurality of relay devices 3 are the same, and the positions of the terminal devices 2a and 2b and the positions of the obstacle 4a and the obstacle 4b are substantially the same. That is, the environment (A) and the environment (B) are similar to each other.

In the environment (A), the first channel transfers radio waves between the base station device 1 and the terminal device 2a via the reconfigurable intelligent surface 30 of the first relay device 31. The second channel transfers radio waves between the base station device 1 and the terminal device 2a via the reconfigurable intelligent surface 30 of the second relay device 32. The n-th channel transfers radio waves between the base station device 1 and the terminal device 2a via the reconfigurable intelligent surface 30 of the n-th relay device 3n.

In the environment (B), the first channel transfers radio waves between the base station device 1 and the terminal device 2b via the reconfigurable intelligent surface 30 of the first relay device 31. The second channel transfers radio waves between the base station device 1 and the terminal device 2b via the reconfigurable intelligent surface 30 of the second relay device 32. The n-th channel transfers radio waves between the base station device 1 and the terminal device 2b via the reconfigurable intelligent surface 30 of the n-th relay device 3n.

(2) Base Station Device

In order to perform communication using the reconfigurable intelligent surface 30 of the relay device 3, the base station device 1 needs to acquire channel state information (CSI) indicating the state of a channel passing through the reconfigurable intelligent surface 30, and to determine the use of the relay device 3 (reconfigurable intelligent surface 30). However, since the acquisition of CSI needs to be executed sequentially on the reconfigurable intelligent surface 30 of each relay device 3, the overhead is large.

Therefore, in order to reduce the influence of overhead, the base station device 1 of the present embodiment determines the relay device 3 (reconfigurable intelligent surface 30) to be used at the present time, by reusing channel state information (CSI) acquired in the past, as in the environment (A) and the environment (B) shown in FIG. 1, when the current environment is similar to the past environment.

Figure 2:
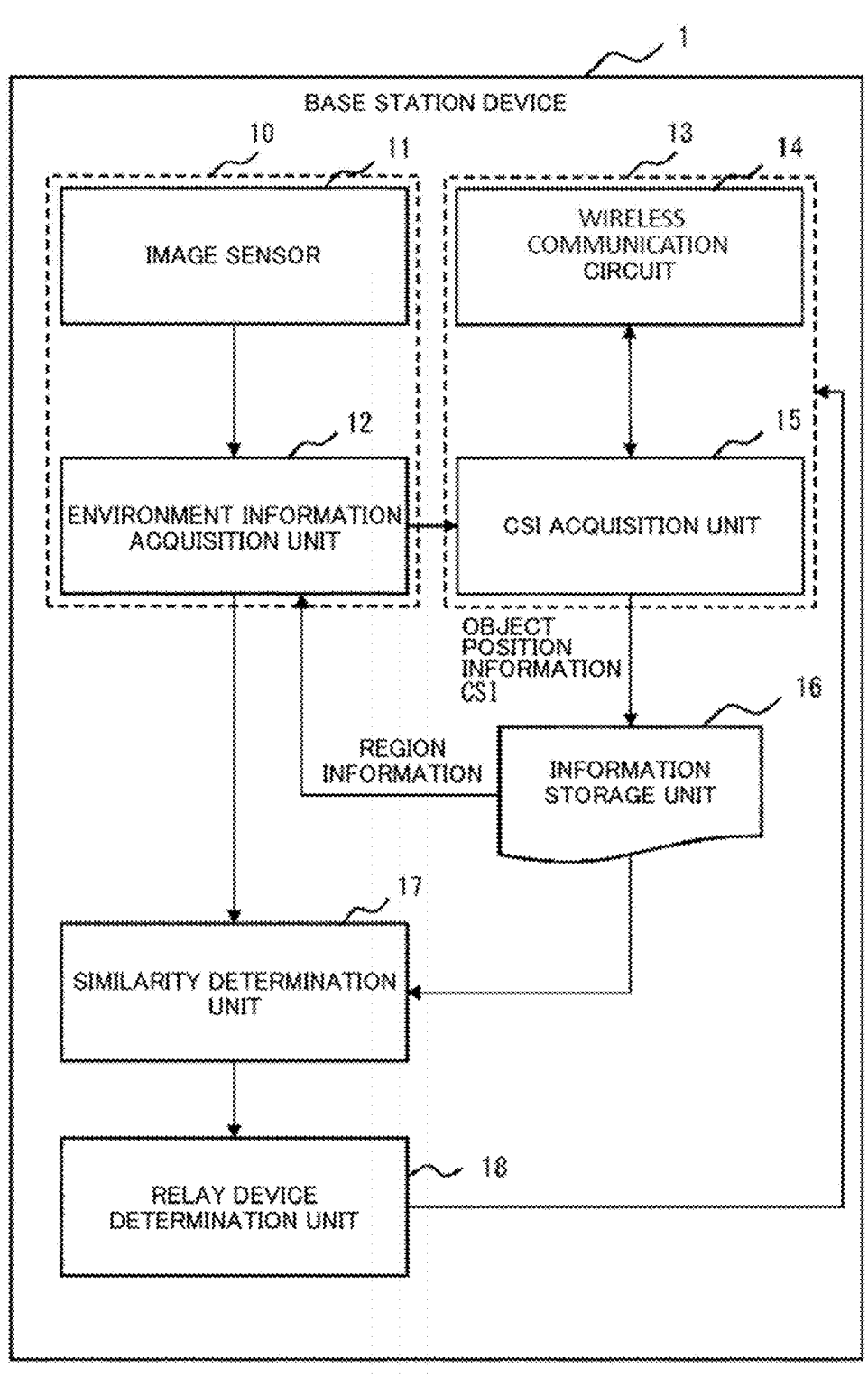
FIG. 2 is a block diagram showing an outline of functions possessed by the base station device according to an embodiment of the present invention.

FIG. 2 is a block diagram showing an outline of functions of the base station 1 device according to the embodiment of the present invention. As shown in FIG. 2, the base station device 1 includes a sensor unit 10, a radio unit 13, an information storage unit 16, a similarity determination unit 17, and a relay device determination unit 18.

The sensor unit 10 acquires object position information including positions of the obstacle 4 and the terminal device 2. For example, the sensor unit 10 includes an image sensor 11 and an environment information acquisition unit 12.

The image sensor 11 of the sensor unit 10 photographs a use range of the terminal device 2 made up of a plurality of regions (FIG. 3) which are periodically divided into a lattice shape, and outputs it as image data. The image sensor 11 is a semiconductor sensor used in a digital camera, and converts light incident from a lens of the camera into an electric signal and outputs the electric signal as image data. An angle of view of the camera is fixed, and a correspondence between each position of the use range (in real space) of the terminal device 2 and each position of the image data is predetermined.

For example, the use range of the terminal device 2 is a range divided by tiles on a floor surface, and each of the plurality of regions divided in a lattice shape corresponds to one of the plurality of tiles disposed on the floor surface. When an object such as an obstacle 4 or a terminal device 2 (a "person" when a person carries the terminal device 2 and a "moving body" when a moving body is mounted) exists in the use range of the terminal device 2, the object is photographed together with the use range. The image data generated by photographing is output to an environment information acquisition unit 12.

The environment information acquisition unit 12 of the sensor unit 10 searches image data of a plurality of regions photographed by the image sensor 11, and acquires the position of the region in which the obstacle 4 exists and the position of the region in which the terminal device 2 exists, as object position information.

Specifically, the environment information acquisition unit 12 first acquires image data of a use range of the terminal device 2 photographed by the image sensor 11. The environment information acquisition unit 12 recognizes the image data as a plurality of regions divided in a lattice shape. The environment information acquisition unit 12 searches the image data and finds a region in which an object (the terminal device 2, and the obstacle 4) exists among the plurality of regions. The environment information acquisition unit 12 acquires a center coordinates (center coordinates of tiles) of the region in which the object exists from the region information stored in the information storage unit 16.

FIG. 4 is a diagram showing an example of the region information stored in the information storage unit 16. The information storage unit 16 stores, with respect to the use range of the terminal device 2, the number of a plurality of regions (tiles 1, tiles 2, . . . ) divided into a grid shape, and region information defining the center X coordinate and the center Y coordinate in advance. For example, the distance between the centers of adjacent regions is, for example, about several tens centimeters to several meters.

Referring back to FIG. 2, the description will continue. In addition, the radio unit 13 perform the wireless communication with the terminal device 2. For example, the radio unit 13 performs the wireless communication with the terminal device 2 via the reconfigurable intelligent surface 30 of the relay device 3 determined by the relay device determination unit 18.

The radio unit 13 acquires channel state information (CSI) of each of the plurality of channels. That is, the radio unit 13 acquires first channel state information of a first channel, second channel state information of a second channel, . . . , n-th channel state information of a n-th channel.

For example, the radio unit 13 includes a wireless communication circuit 14 and a CSI acquisition unit 15. The wireless communication circuit 14 includes an antenna and a transmission and reception circuit. The CSI acquisition unit 15 periodically transfers a known signal used for estimating CSI via the wireless communication circuit 14. The terminal device 2 feeds back CSI estimated on the basis of the received signal to the base station device 1 (CSI feedback, IEEE 802.11ac). That is, the CSI is periodically acquired.

Figure 7:
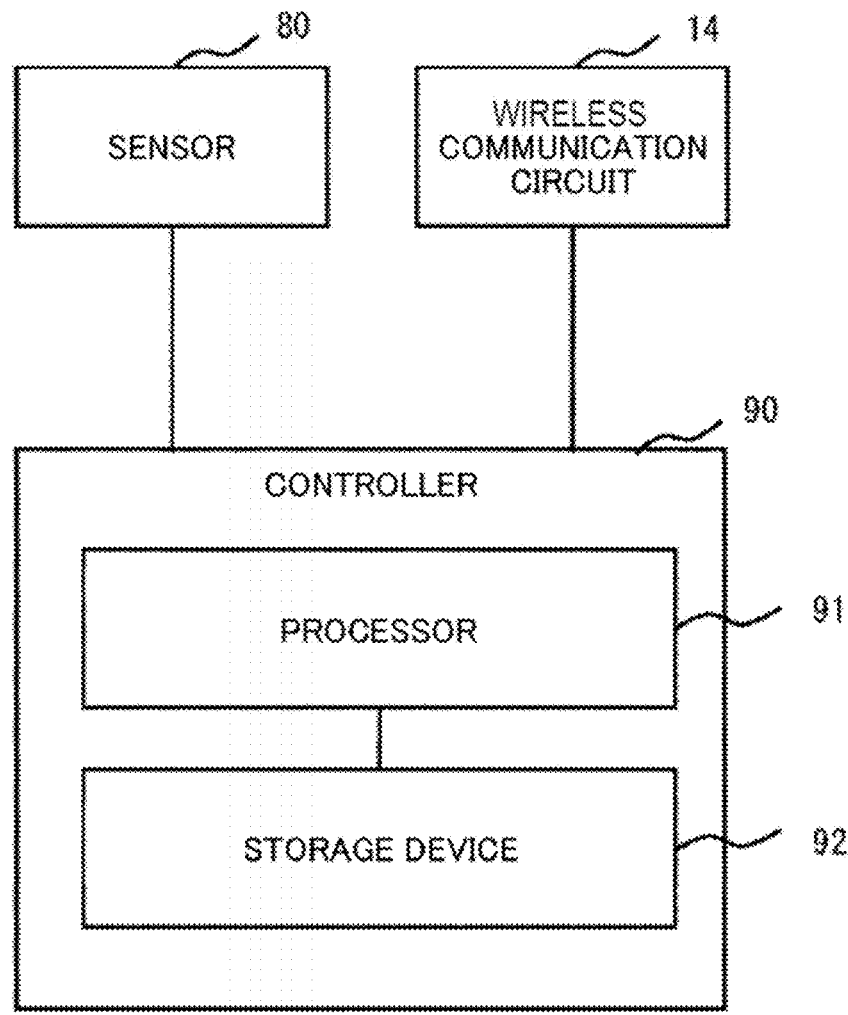
FIG. 7 is a diagram showing a hardware structural example of the base station device according to the embodiment of the present invention.

The information storage unit 16 stores object position information acquired by the sensor unit 10 and a plurality of pieces of channel state information (first channel state information, second channel state information, . . . , n-th channel state information) acquired by the radio unit 13 regarding the object position information in association with each other. Various types of information stored in the information storage unit 16 is stored in the storage device 92 (FIG. 7).

A similarity determination unit 17 determines whether the current object position information acquired by the sensor unit 10 is similar to the past object position information stored in the information storage unit 16. Specifically, the similarity determination unit 17 determines that the current object position information is similar to the past object position information, when a region in which the obstacle 4 exists and a region in which the terminal device 2 exists in the current object position information are the same as a region in which the obstacle 4 exists and a region in which the terminal device 2 exists in the past object position information.

When it is determined that the current object position information is similar to the past object position information, a relay device determination unit 18 reads a plurality of pieces of channel state information associated with the past object position information similar to the current object position information from the information storage unit 16. The relay device determination unit 18 determines at least one relay device 3 (reconfigurable intelligent surface 30) to be used at the present time among the plurality of relay devices 3 (a first relay device 31, a second relay device 32, . . . , and a n-th relay device 3n), on the basis of the plurality of pieces of channel state information. The base station device 1 executes control for the radio unit 13 to communicate with the terminal device 2, using the determined reconfigurable intelligent surface 30 of the relay device 3. Thus, the base station device 1 can determine the relay device to be used at the present time without waiting for acquisition of the latest channel state information (CSI) with respect to the current object position information.

After the latest channel state information (CSI) is acquired by the CSI acquisition unit 15, the relay device determination unit 18 determines a relay device to be used on the basis of the latest channel state information. Thus, after the latest channel state information is acquired, the base station device 1 can re-determine the optimal relay device.

Figure 5:
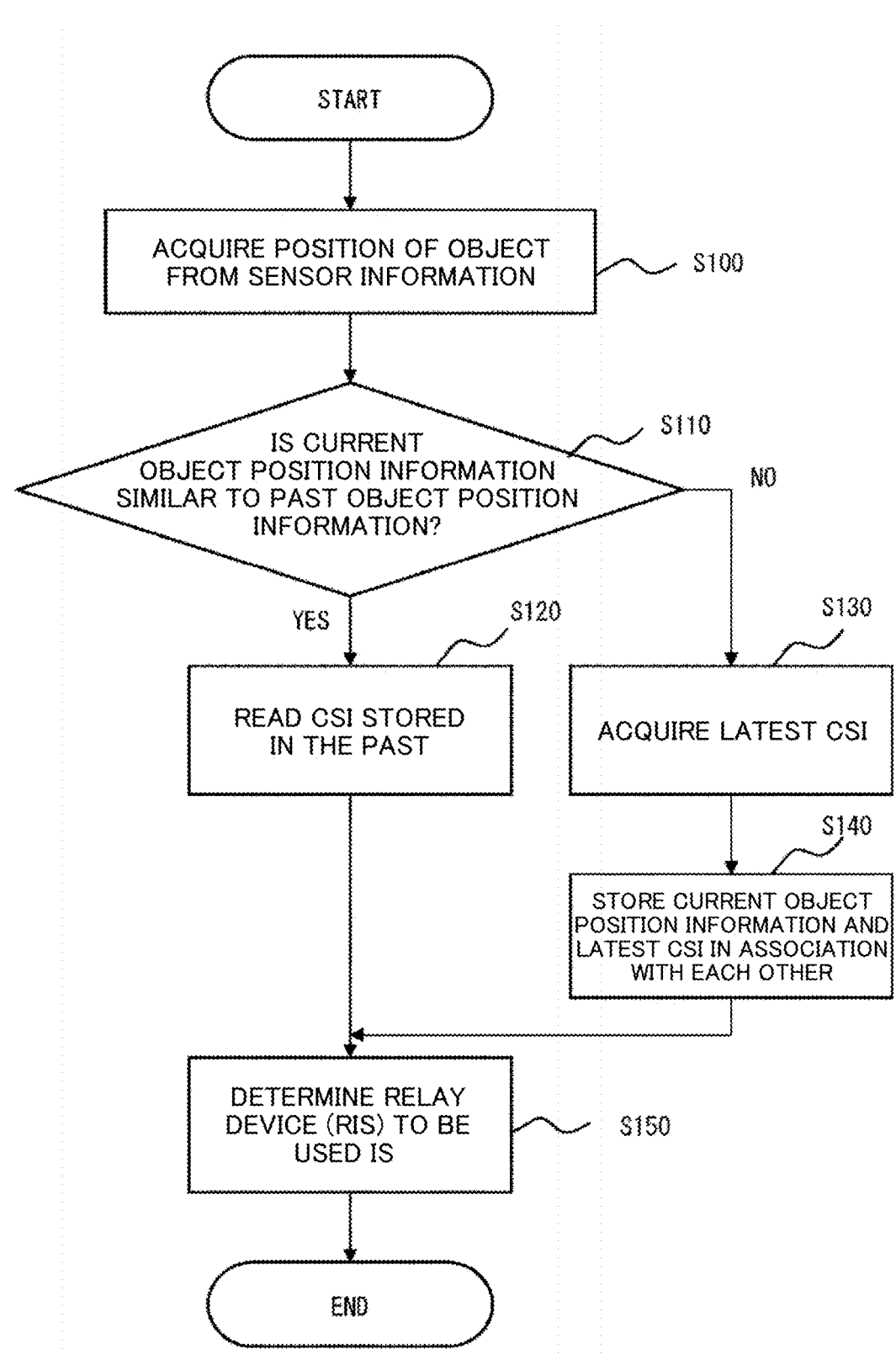
FIG. 5 is a flowchart showing processing executed by the base station device according to the embodiment of the present invention.

FIG. 5 is a flow chart showing a process which is executed by the base station device 1 according to the embodiment when acquiring the environment information.

Figure 6:
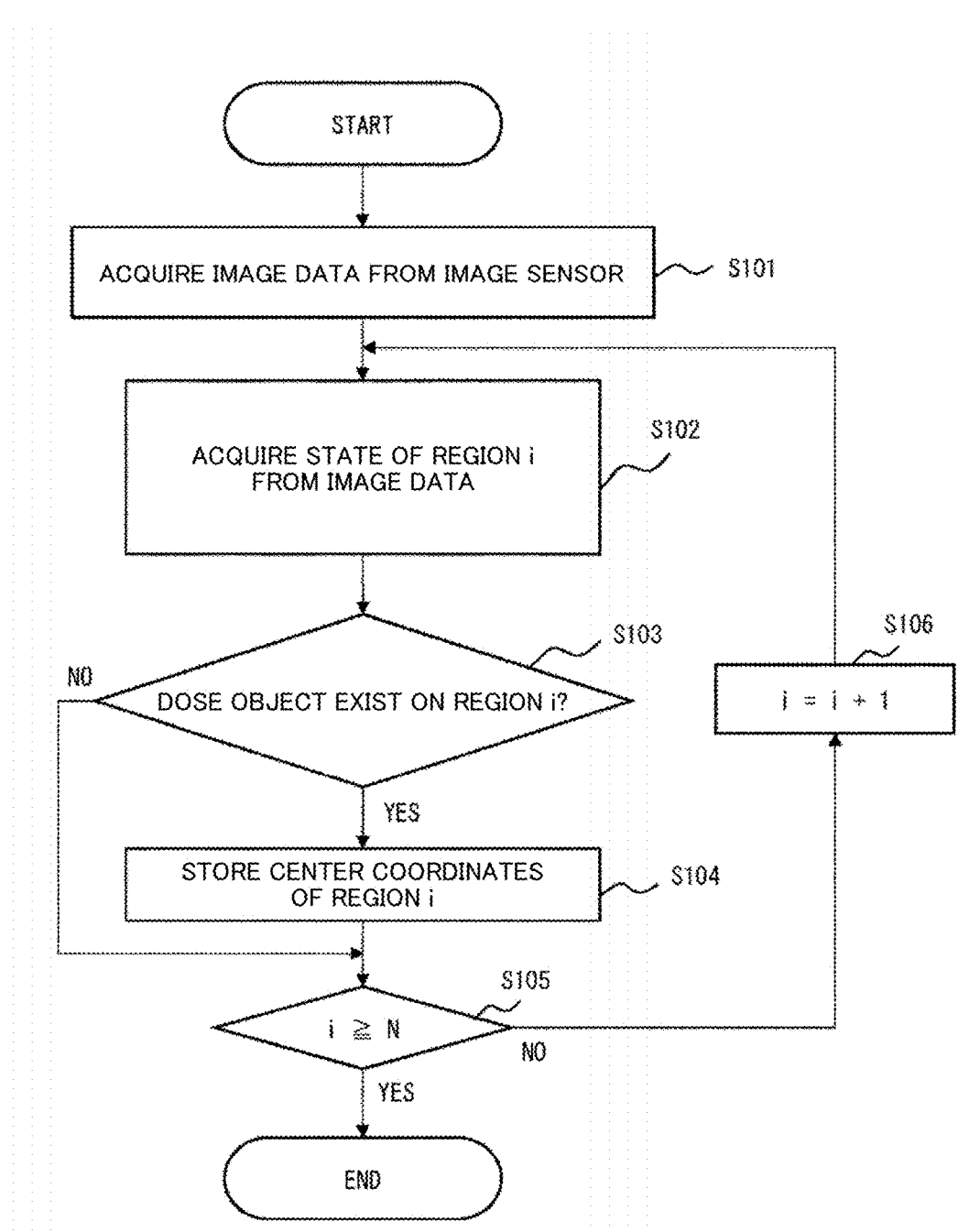
FIG. 6 is a flowchart showing processing of the sensor unit according to the embodiment of the present invention.

In step S100, the environment information acquisition unit 12 acquires object position information of the obstacle 4 and the terminal device 2 from the image data acquired by the image sensor 11. Details will be described with reference to FIG. 6. FIG. 6 is a flowchart showing a process of acquiring object position information which is executed by the environment information acquisition unit 12. An initial value of the variable i is 1.

In step S101, the environment information acquisition unit 12 acquires an image data from the image sensor 11.

Figure 3:
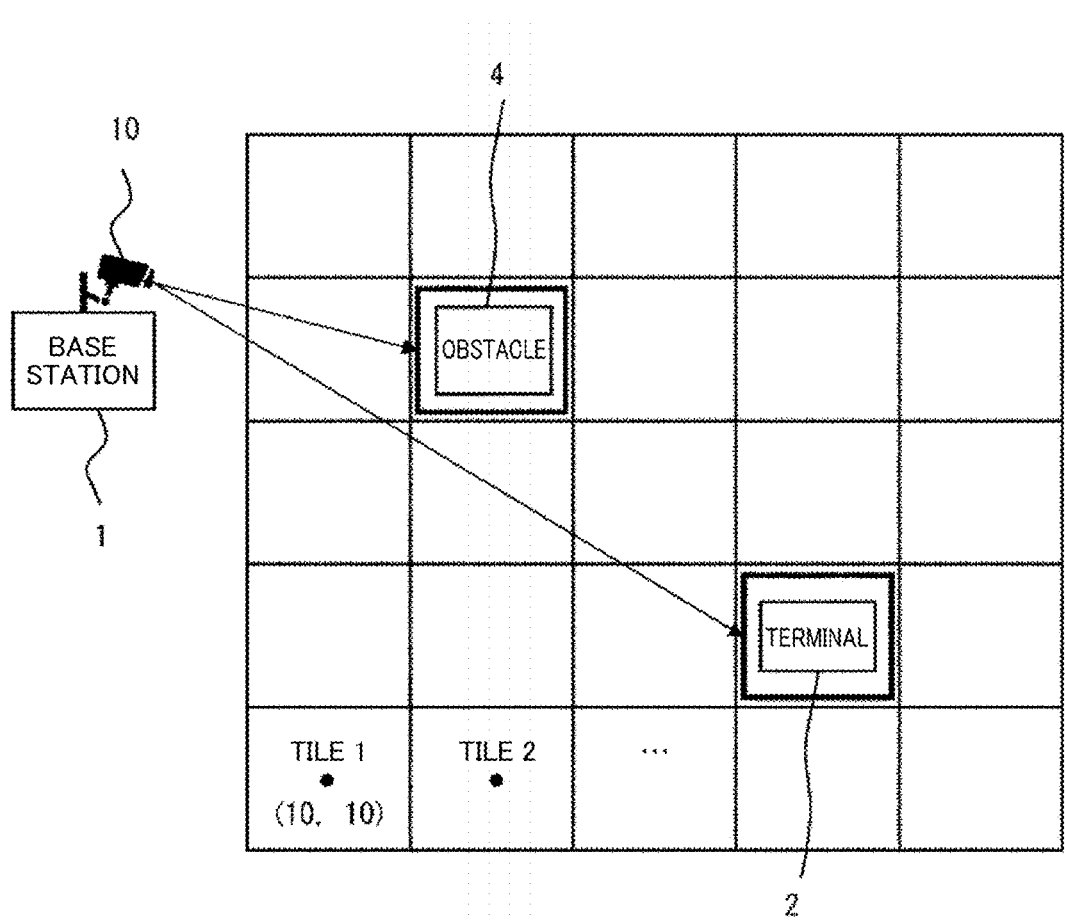
FIG. 3 is a diagram for explaining object search processing of a sensor unit according to the embodiment of the present invention.

Next, in step S102, the environment information acquisition unit 12 acquires the state of the region i from the image data. For example, in the case if i=1, an image corresponding to the tile 1 portion of FIG. 3 is acquired.

Next, in step S103, the environment information acquisition unit 12 determines whether an object exists on an image corresponding to the region i. For example, if i=1, it is determined whether an object is projected on the image corresponding to the tile 1 portion of FIG. 3. When an object exists in a portion corresponding to the region i of the image data, the processing of step S104 is executed. Next, the processing of step S105 is executed, when there is no object.

In step S104, the environment information acquisition unit 12 adds the center coordinates of the region i to the object position information. The center coordinates of each region are stored in the information storage unit 16 in advance as region information.

In step S105, it is determined whether the variable i is equal to or more than the total number N of areas. When the determination condition is satisfied, it is determined that the search of the object has been completed for all regions of the image data. The object position information is output to the CSI acquisition unit 15 and the similarity determination unit 17, and this routine is terminated. On the other hand, when the determination condition is not established, the variable i is incremented by 1 in step S106, and the processing is restarted from step S102 to the new region i.

As described above, according to the processing shown in FIG. 6, the sensor unit outputs object position information on the basis of the image data.

Referring back to FIG. 5, the description will continue. In step S110, the similarity determination unit 17 determines whether the current object position information acquired by the sensor unit 10 is similar to the past object position information stored in the information storage unit 16. When the determination condition is satisfied, the processing of step S120 is executed. On the other hand, when the determination condition is not established, the processing of step S130 is executed.

In step S120, when it is determined that the current object position information is similar to the past object position information, the relay device determination unit 18 reads a plurality of pieces of channel state information (CSI) associated with the past object position information similar to the current object position information from the information storage unit 16. Thereafter, the processing of step S150 is executed.

In step S150, the relay device determination unit 18 determines at least one relay device 3 (reconfigurable intelligent surface 30) which is used at present time among the plurality of relay devices 3 (the first relay device 31, the second relay device 32, . . . , the n-th relay device 3n) on the basis of the plurality of pieces of channel state information.

On the other hand, in step S110, when it is determined that there is no past object position information similar to the current object position information, it is necessary to acquire the latest channel state information (CSI). Therefore, in step S130, the radio unit 13 acquires channel state information (CSI) of each channel in the current object position information. The acquisition of the channel state information requires a predetermined time (overhead).

Next, in step S140, the information storage unit 16 stores current object position information acquired by the sensor unit 10 and a plurality of pieces of latest channel state information (first channel state information, second channel state information, . . . n-th channel state information) acquired by the radio unit 13 regarding the object position information in association with each other.

Next, in step S150, at least one relay device 3 (reconfigurable intelligent surface 30) used at present time among the plurality of relay devices 3 (first relay device 31, second relay device 32, . . . , n-th relay device 3n) is determined, on the basis of the latest channel state information of each channel.

(3) Effect

As described above, according to the base station device 1 of the present embodiment, when the current environment is similar to the past environment, it is possible to determine the relay device 3 (reconfigurable intelligent surface 30) to be used at the present time by utilizing the CSI stored in the past, without waiting for acquisition of the latest channel state information (CSI) with respect to the current object position information. Therefore, according to the present disclosure, it is possible to reduce overhead for acquiring CSI, and to simultaneously execute the use determination of a plurality of reconfigurable intelligent surfaces. After the latest channel state information is acquired, the base station device 1 can re-determine the optimal relay device 3 (reconfigurable intelligent surface 30) on the basis of the latest channel state information.

(4) Hardware Configuration Example

FIG. 7 is a block diagram showing a hardware configuration example of the base station device 1 according to the present embodiment. The base station device 1 includes a controller 90, a sensor 80, and a wireless communication circuit 14 (FIG. 2).

The controller 90 controls the base station device 1. The controller 90 includes, for example, one or more processors 91 (hereinafter simply referred to as "processor 91") and one or more storage devices 92 (hereinafter simply referred to as "storage device 92"). The processor 91 carries out various information processing (including processing of each part shown in FIG. 2). The processor 91 includes, for example, a CPU. The storage device 92 stores various information necessary for the processing executed by the processor 91. As the storage device 92, a volatile memory, a non-volatile memory, HDD, SSD, and the like are exemplified. As a result of the processor 91 executing a control program, which is a computer program, the function of the controller 90 is realized. The control program 103 is stored in the storage device 92. The control program may be recorded in a computer-readable recording medium.

Some or all of the functions of the controller 90 may be constituted by hardware, or may be constituted as a program to be executed by a processor. That is the controller 90 can also be implemented by a computer and a program, and the program can also be recorded on a recording medium or provided through a network.

The sensor 80 is a sensor for acquiring information on positions of the obstacle 4 and the terminal device 2. The sensor 80 is, for example, an image sensor 11 (FIG. 2). The wireless communication circuit 14 performs wireless communication with the terminal device 2 and the relay device 3. The wireless communication circuit 14 includes, for example, an antenna and a transmission and reception circuit. The wireless communication circuit 14 is controlled by the controller 90 (processor 91).

Although the embodiments of the present invention have been described above, the present invention is not limited to the above-described embodiments, and various modifications can be made without departing from the scope of the present invention. That is, the present invention is not limited to the mentioned numbers except for a case in which numbers such as the number, quantity, amount, or range of each element are mentioned in the above embodiment, a case in which the numbers are particularly specified, or a case in which the numbers are clearly specified in principle. Also, the structures and the like described in the above-described embodiments are not necessarily essential to the present invention unless otherwise specified or clearly specified in principle.

REFERENCE SIGNS LIST

1 Base station device
2, 2a, 2b Terminal device
3, 31, 32, 3n Relay device, first relay device, second relay device, and n-th relay device
4, 4a, 4b Obstacle
10 Sensor unit
11 Image sensor
12 Environment information acquisition unit
13 Radio unit
14 Wireless communication circuit 15 CSI acquisition unit
16 Information storage unit
17 Similarity determination unit
18 Relay device determination unit
30 Reconfigurable intelligent surface
80 Sensor
90 Controller
91 Processor
90 Storage device

The invention claimed is:

1. A wireless communication system including a base station device, a terminal device, and at least a first relay device and a second relay device, wherein the first relay device and the second relay device each have a reconfigurable intelligent surface that reflects a radio wave, and the base station device is able to use a first channel for communicating with the terminal device via the reconfigurable intelligent surface of the first relay device, and a second channel through which the base station device communicates with the terminal device via the reconfigurable intelligent surface of the second relay device, wherein the base station device includes:

a sensor which acquires object position information including positions of an obstacle and the terminal device;

radio circuitry which acquires first channel state information of the first channel and second channel state information of the second channel;

an information storage memory which stores past object position information acquired by the sensor, and the first channel state information and the second channel state information acquired by the radio circuitry with respect to the past object position information in association with each other;

similarity determination circuitry which determines whether current object position information acquired by the sensor is similar to the past object position information stored in the information storage memory; and relay device determination circuitry which determines a relay device to be used at a present time, among the first relay device and the second relay device, on the basis of the first channel state information and the second channel state information associated with the past object position information similar to the current object position information, when it is determined that the current object position information is similar to the past object position information.

2. The wireless communication system according to claim 1, wherein the sensor includes:

an image sensor which photographs a plurality of regions divided into a grid shape, and environment information acquisition circuitry which searches for image data of the plurality of regions photographed by the image sensor, and acquires a position of a region in which the obstacle exists and a position of a region in which the terminal device exists as the object position information, and wherein the similarity determination circuitry determines that the current object position information is similar to the past object position information, when the region in which the obstacle exists and the region in which the terminal device exists in the current object position information are the same as the region in which the obstacle exists and the region in which the terminal device exists in the past object position information.

3. The wireless communication system according to claim 2, wherein:

each of the plurality of regions corresponds to one of a plurality of tiles disposed on a floor surface.

4. A wireless communication method for use with a first channel through which a base station device communicates with a terminal device via a reconfigurable intelligent surface of a first relay device and a second channel through which the base station device communicates with the terminal device via a reconfigurable intelligent surface of a second relay device, the method comprising:

acquiring object position information including positions of an obstacle and the terminal device;

acquiring first channel state information of the first channel and second channel state information of the second channel;

storing past object position information, and the first channel state information and the second channel state information acquired step with respect to the past object position information in association with each other;

determining whether current object position information is similar to the past object position information; and determining a relay device to be used at a present time, among the first relay device and the second relay device, on the basis of the first channel state information and the second channel state information associated with the past object position information similar to the current object position information, when it is determined that the current object position information is similar to the past object position information.

5. The wireless communication method according to claim 4, wherein:

the base station device includes an image sensor which photographs a plurality of regions divided into a grid shape, the acquiring object position information includes searching for image data of the plurality of regions photographed by the image sensor, and acquiring a position of a region in which the obstacle exists and a position of a region in which the terminal device exists as the object position information, and the determining whether the current object position information is similar to the past object position includes determining that the current object position information is similar to the past object position information, when the region in which the obstacle exists and the region in which the terminal device exists in the current object position information are the same as the region in which the obstacle exists and the region in which the terminal device exists in the past object position information.

6. The wireless communication method according to claim 5, wherein:

each of the plurality of regions corresponds to each of a plurality of tiles disposed on a floor surface.

7. A base station device for use with a first channel through which the base station device communicates with a terminal device via a reconfigurable intelligent surface of a first relay device and a second channel through which the base station device communicates with the terminal device via a reconfigurable intelligent surface of a second relay device, the base station device comprising:

a sensor which acquires object position information including positions of an obstacle and the terminal device;

radio circuitry which acquires first channel state information of the first channel and second channel state information of the second channel;

an information storage memory which stores past object position information acquired by the sensor, and the first channel state information and the second channel state information acquired by the radio circuitry with respect to the past object position information in association with each other;

similarity determination circuitry which determines whether current object position information acquired by the sensor is similar to the past object position information stored in the information storage memory; and relay device determination circuitry which determines a relay device to be used at a present time, among the first relay device and the second relay device, on the basis of the first channel state information and the second channel state information associated with the past object position information similar to the current object position information, when it is determined that the current object position information is similar to the past object position information.

8. The base station device according to claim 7, wherein the sensor includes:

an image sensor which photographs a plurality of regions divided into a grid shape, and environment information acquisition circuitry which searches for image data of the plurality of regions photographed by the image sensor, and acquires a position of a region in which the obstacle exists and a position of a region in which the terminal device exists as the object position information, wherein the similarity determination circuitry determines that the current object position information is similar to the past object position information, when the region in which the obstacle exists and the region in which the terminal device exists in the current object position information are the same as the region in which the obstacle exists and the region in which the terminal device exists in the past object position information.

* * * * *